United States Patent
Zhao et al.

(10) Patent No.: US 11,525,194 B2
(45) Date of Patent: Dec. 13, 2022

(54) METHOD AND DEVICE FOR GENERATING JACQUARD PATTERN, ELECTRONIC DEVICE AND READABLE STORAGE MEDIUM

(71) Applicant: Nanjing Fiberglass Research & Design Institute Co., Ltd., Nanjing (CN)

(72) Inventors: Qian Zhao, Nanjing (CN); Fangfang Sun, Nanjing (CN); Haili Zhou, Nanjing (CN); Chao Li, Nanjing (CN); Liquan Zhang, Nanjing (CN); Hongwei Guo, Nanjing (CN)

(73) Assignee: Nanjing Fiberglass Research & Design Institute Co., Ltd., Nanjing (CN)

( * ) Notice: Subject to any disclaimer, the term of this patent is extended or adjusted under 35 U.S.C. 154(b) by 0 days.

(21) Appl. No.: 17/275,618

(22) PCT Filed: Mar. 25, 2020

(86) PCT No.: PCT/CN2020/081205
§ 371 (c)(1),
(2) Date: Mar. 11, 2021

(87) PCT Pub. No.: WO2021/134937
PCT Pub. Date: Jul. 8, 2021

(65) Prior Publication Data
US 2022/0119992 A1    Apr. 21, 2022

(30) Foreign Application Priority Data
Dec. 31, 2019   (CN) .................. 201911402730.3

(51) Int. Cl.
*D03C 19/00*    (2006.01)
*D03D 25/00*    (2006.01)
(Continued)

(52) U.S. Cl.
CPC ......... *D03C 19/005* (2013.01); *D03D 13/004* (2013.01); *D03D 25/005* (2013.01); *G06V 10/56* (2022.01); *G05B 2219/45192* (2013.01)

(58) Field of Classification Search
None
See application file for complete search history.

(56) References Cited

U.S. PATENT DOCUMENTS 3,529,298 A * 9/1970 Richmond ............ G06T 11/001
66/1 R
3,634,827 A * 1/1972 Lourie ................. D03C 19/005
700/131
(Continued)

FOREIGN PATENT DOCUMENTS

CN      1776052      5/2006
CN    101967712      2/2011
(Continued)

OTHER PUBLICATIONS

Fazeli Monireh et al: "Development of three-dimensional profiled woven fabrics on narrow fabric looms", Textile Research Journal, [Online] vol. 86, No. 12, Oct. 5, 2015 (Oct. 5, 2015), pp. 1328-1340.
(Continued)

*Primary Examiner* — Khoa D Huynh
*Assistant Examiner* — Grace Huang
(74) *Attorney, Agent, or Firm* — David R. Stevens; Stevens Law Group

(57) ABSTRACT

The present application discloses a method and device for generating a jacquard pattern, an electronic device. The method comprises: acquiring structure information of a unit structure of a preform to be prepared, wherein the structure information comprises a positional relationship between the warp yarns and the weft yarns of the unit structure of a preform to be prepared; obtaining a row number and a column number of the jacquard pattern to be generated, and
(Continued)

correspondence between each pixel in the jacquard pattern to be generated and the warp yarns and weft yarns of the unit structure of the preform to be prepared, according to the structure information; and obtaining a pixel value of each pixel according to the correspondence and the positional relationship between the warp yarns and the weft yarns, and generating the jacquard pattern to be generated.

5 Claims, 7 Drawing Sheets

(51) Int. Cl.
  *G06V 10/56* (2022.01)
  *D03D 13/00* (2006.01)

(56) References Cited

U.S. PATENT DOCUMENTS

| | | | | |
|---|---|---|---|---|
| 4,346,366 | A * | 8/1982 | Kajiura | G06T 1/0007 700/141 |
| 5,246,040 | A * | 9/1993 | Barwick | D03C 19/005 139/55.1 |
| 7,460,927 | B1 * | 12/2008 | Lai | D04B 7/08 66/232 |
| 8,506,303 | B1 * | 8/2013 | Smith | G09B 19/20 434/95 |
| 8,733,406 | B2 * | 5/2014 | Hannes | D03D 13/002 139/232 R |
| 9,984,261 | B2 * | 5/2018 | Gonzales, Jr. | G06Q 30/018 |
| 2008/0009960 | A1 * | 1/2008 | Jinlian | D03C 19/005 700/138 |
| 2014/0232165 | A1 * | 8/2014 | Brielmann | D03D 1/0005 139/11 |
| 2022/0106715 | A1 * | 4/2022 | Zhao | D03D 13/004 |

FOREIGN PATENT DOCUMENTS

| | | |
|---|---|---|
| CN | 102057091 | 5/2011 |
| CN | 102181984 A | 9/2011 |
| CN | 102505243 A | 6/2012 |
| CN | 102523366 A | 6/2012 |
| CN | 103088515 A | 5/2013 |
| CN | 103471974 A | 12/2013 |
| CN | 104160079 A | 11/2014 |
| CN | 104726992 A | 6/2015 |
| CN | 106939462 A | 7/2017 |
| CN | 107330148 A | 11/2017 |
| CN | 109537137 A | 3/2019 |
| CN | 109919028 A | 6/2019 |
| CN | 110502657 A | 11/2019 |
| JP | 2008242516 | 10/2008 |

OTHER PUBLICATIONS

Boussu François et al: "General definition of 3D warp interlock fabric architecture", Composites: Part B, [Online] vol. 81, Jul. 31, 2015 (Jul. 31, 2015), pp. 171-188.
Janice R. Lourie: "Loom-constrained designs", Aug. 26, 1969 (Aug. 26, 1969), pp. 185-192.
Behera B K et al: "3-Dimensional 1-10 Weaving", Indian Journal of Fibre & Textile Research, vol. 33, Sep. 1, 2008 (Sep. 1, 2008), pp. 274-287.
Qu Hongmin, "Computer-aided design for Woven fabric structure and appearance", retrieved from Wanfang Database on Jun. 2, 2015.
Zhou Yijie, "Research on Multilayer Fabric Structure and Development of CAD Software", retrieved from Wanfang Database on Jul. 25, 2007.
First Chinese Office Action, Application No. 2019114027303.
Second Chinese Office Action, Application No. 2019114027303.
Supplementary European Search Report, Application No. 20859639. 5-1224, dated Nov. 10, 2021.
Search Report and Written Opinion, PCT/CN2020/081205, dated Sep. 27, 2020.

* cited by examiner

METHOD AND DEVICE FOR GENERATING JACQUARD PATTERN, ELECTRONIC DEVICE AND READABLE STORAGE MEDIUM

TECHNICAL FIELD

The present application relates to the technical field of manufacturing, in particular to a method and a device for generating a jacquard pattern, an electronic device and readable storage medium.

BACKGROUND

As a kind of composite reinforced structure, 3D woven preform is more and more widely used in and the fields such as aviation, aerospace, architecture, automobile, etc. Because most of the processes in the process of manufacturing three-dimensional preforms with traditional second-generation looms need manual participation, and the shedding is controlled by lifting or lowering a heald frame, the number of heald frames is different when the structure is different. Especially for the manufacturing of complex structures, multiple heald frames are needed, which means, the efficiency of manufacturing the three-dimensional woven preform with a traditional second-generation looms is low, and the structure is limited by the number of heald frames. Therefore, in order to meet the preparation requirements, currently the shedding is controlled mostly by adopting an electronic jacquard system during manufacturing of the three-dimensional preforms. The characteristic of this system is that the movement of each warp yarn can be controlled independently, and the movement relationship of all warp yarns and weft yarns is reflected on the jacquard pattern. As long as the corresponding jacquard pattern can be provided, the preforms with any structure can be woven. Therefore, the editing of jacquard pattern is the key and difficult point in the whole weaving process.

At present, the generation process of a jacquard pattern mainly includes: establishing a primitive structure, establishing a color corresponding to the primitive structure, laying the structure on corresponding color blocks of the jacquard pattern, and generating the jacquard board. However, because the most important step in the above process, i.e., "laying the structure on corresponding color blocks of the jacquard pattern" is manual operation, this method for generating the jacquard pattern is only suitable for the generation of a jacquard pattern of a preform with simple primitive structure and limited number, but for those with complex and high variable structures, the jacquard pattern generated using the above method will be time consuming, and there is a high possibility of making errors in the process of generation, which may cause low accuracy of the generated jacquard pattern.

SUMMARY

In view of this, embodiments of the present application provides a method and a device for generating a jacquard pattern, an electronic device and readable storage medium, in order to solve the problems that the existing jacquard pattern generation needs to be realized by manually coloring color blocks (i.e., pixels) in the jacquard pattern, and the efficiency and accuracy of jacquard pattern generation are low.

According to a first aspect, the embodiments of the present application provide a method for generating a jacquard pattern, which comprises the following steps: acquiring structure information of a unit structure of a preform to be prepared, wherein the structure information comprises a warp yarn column number, a warp yarn layer number, a weft yarn column number and a weft yarn layer number, as well as a positional relationship between the warp yarns and the weft yarns of the unit structure of a preform to be prepared; obtaining a row number and a column number of the jacquard pattern to be generated, and correspondence between each pixel in the jacquard pattern to be generated and the warp yarns and weft yarns of the unit structure of the preform to be prepared, according to the structure information; and obtaining a pixel value of each pixel according to the correspondence and the positional relationship between the warp yarns and the weft yarns, and generating the jacquard pattern to be generated; wherein, the pixel value, comprising a first pixel value and a second pixel value, is equal to the first pixel value when the warp yarns corresponding to the pixel are located above corresponding weft yarns, and is equal to the second pixel value when the warp yarns corresponding to the pixel are located below corresponding weft yarns.

In the present application, structure information of a unit structure of a preform to be prepared is acquired, wherein the structure information comprises a warp yarn column number, a warp yarn layer number, a weft yarn column number and a weft yarn layer number, as well as a positional relationship between the warp yarns and the weft yarns of the unit structure of a preform to be prepared, and acquisition of the data information which can describe the three-dimensional woven structure of the unit structure of a preform to be prepared prepares the data for subsequent generation of the jacquard pattern. And obtaining a row number and a column number of the jacquard pattern to be generated, and correspondence between each pixel in the jacquard pattern to be generated and the warp yarns and weft yarns of the unit structure of the preform to be prepared according to the structure information enables obtaining of the positional relationship between warp and weft yarns corresponding to each pixel in the jacquard pattern to be generated from the structure information according to the correspondence, so that when the warp yarns corresponding to pixels are located above the corresponding weft yarns, the pixel values of the pixels are the first pixel value, and when the warp yarns corresponding to the pixels are located below the corresponding weft yarns, the pixel values of the pixels are the second pixel value; and finally, the pixel value of each pixel of the jacquard pattern to be generated can be determined according to the correspondence and the positional relationship between warp and weft yarns, thereby realizing automatic generation of the jacquard pattern to be generated.

In the present application, what is requested to be manually operated is to provide structure information, that is, to provide a warp yarn column number, a warp yarn layer number, a weft yarn column number and a weft yarn layer number, as well as a positional relationship between the warp yarns and the weft yarns of the unit structure of a preform to be prepared, the workload and difficulty of manually confirming this information are smaller than that of coloring each pixel in the jacquard pattern. Therefore, the method for generating a jacquard pattern can improve the generation efficiency and accuracy of the generated jacquard pattern.

Combined with the first aspect, in a first embodiment of the first aspect, the step of obtaining structure information of the unit structure of the preform to be prepared comprises the following steps of: acquiring structure information of a unit structure of a preform to be prepared, wherein the structure information comprises a warp yarn column number, a warp yarn layer number, a weft yarn column number and a weft yarn layer number, as well as a positional relationship between the warp yarns and the weft yarns of the unit structure of a preform to be prepared; acquiring an actual warp yarn layer number information of the unit structure of a preform to be prepared and yarn increasing position information of the primitive structure; and performing layer increasing to the primitive structure according to the actual warp yarn layer number information and the yarn increasing position information, and obtaining the structure information of the unit structure of the preform to be prepared.

Combined with the first aspect or the first embodiment of the first aspect, in a second embodiment of the first aspect, a structure matrix is used to represent the positional relationship between the warp yarns and weft yarns, wherein a row number of the structure matrix represents a total number of warp yarns, a column number of the structure matrix represents a column number of weft yarns, and elements in the structure matrix represent the number of weft yarns located between corresponding warp yarns and a previous layer of warp yarns of the corresponding warp yarns in corresponding weft yarn columns.

Combined with the second embodiment of the first aspect, in a third embodiment of the first aspect, the row number of the jacquard pattern to be generated is obtained according to the weft yarn column number and the weft yarn layer number of the unit structure of the preform to be prepared, and the column number of the jacquard pattern to be generated is obtained according to the warp yarn column number and the warp yarn layer number of the unit structure of the preform to be prepared.

Combined with the third embodiment of the first aspect, in a fourth embodiment of the first aspect, the step of obtaining a pixel value of each pixel according to the correspondence and the positional relationship between the warp yarns and the weft yarns, and generating the jacquard pattern to be generated comprises: sequentially calculating the total number of weft yarns positioned on the s-th warp yarn in each column of weft yarns according to the elements in the structure matrix, and obtaining pixel values of an s-th column of pixels in the jacquard pattern to be generated according to the total number of weft yarns, wherein the s-th warp yarn is a q-th layer of warp yarns in a j-th column of warp yarns in the unit structure of the preform to be prepared, and for a column of weft yarns, the total number of weft yarns located above the s-th warp yarn is a sum of matrix elements in a row corresponding to a first-layer warp yarn in the j-th column of warp yarns to a row corresponding to the q-th layer of warp yarns in the j-th column of warp yarns in the columns corresponding to the structure matrix.

In combination with the second embodiment of the first aspect, in the fifth embodiment of the first aspect, the row number of the jacquard pattern to be generated is obtained according to the weft yarn layer number and the weft yarn column number of the unit structure of the preform to be prepared, and the column number of the jacquard pattern is obtained according to the warp yarn column number of the unit structure of the preform to be prepared and a preset number of layout yarns of a column of warp yarns in the jacquard pattern to be generated, and the preset number of layout yarns is greater than or equal to the warp yarn layer number.

Combined with a fifth embodiment of the first aspect, in a sixth embodiment of the first aspect, the step of obtaining a pixel value of each pixel according to the correspondence and the positional relationship between the warp yarns and the weft yarns and generating the jacquard pattern to be generated comprises: obtaining a column sequence number $J_s$ corresponding to the s-th warp yarn in the jacquard pattern to be generated, according to the warp yarn column number, the warp yarn layer number and the preset number of layout yarns, wherein the s-th warp yarn is the q-th layer of warp yarns in the j-th column of warp yarns in the unit structure of the preform to be prepared; and sequentially calculating a total number of weft yarns positioned on the s-th warp yarn in each column of weft yarns according to elements in the structure matrix, and obtaining pixel values of pixels in the $J_s$-th column of the jacquard pattern to be generated according to the total number of weft yarns; for a column of weft yarns, the total number of weft yarns on the s-th warp yarn is the sum of matrix elements from a row corresponding to the first layer of warp yarns in the j-th column of warp yarn to a row corresponding to the q-th layer of warp yarns in the j-th column of warp yarns in the columns corresponding to the structure matrix.

According to a second aspect, an embodiment of the present application provides a device for generating a jacquard pattern, which comprises: an information acquisition module, used for acquiring structure information of a unit structure of a preform to be prepared, wherein the structure information comprises a warp yarn column number, a warp yarn layer number, a weft yarn column number and a weft yarn layer number, as well as a positional relationship between the warp yarns and the weft yarns of the unit structure of a preform to be prepared; a relationship determination module, used for obtaining a row number and a column number of the jacquard pattern to be generated, and correspondence between each pixel in the jacquard pattern to be generated and the warp yarns and weft yarns of the unit structure of the preform to be prepared, according to the structure information; and a jacquard pattern generation module, used for obtaining a pixel value of each pixel according to the correspondence and the positional relationship between the warp yarns and the weft yarns, and generating the jacquard pattern to be generated, wherein the pixel value, comprising a first pixel value and a second pixel value, is equal to the first pixel value when the warp yarns corresponding to the pixel are located above corresponding weft yarns, and is equal to the second pixel value when the warp yarns corresponding to the pixel are located below corresponding weft yarns.

According to a third aspect, an embodiment of the present application provides an electronic device, which comprises memory and a processor, which are in communication connection with each other, wherein the memory stores computer instructions therein, and the processor, by executing the computer instructions, executes the method for generating a jacquard pattern in the first aspect or any one of the embodiments of the first aspect.

According to a fourth aspect, an embodiment of the present application provides a computer-readable storage medium storing computer instructions for causing a computer to execute the method for generating a jacquard pattern in the first aspect or any one of the embodiments of the first aspect.

BRIEF DESCRIPTION OF THE DRAWINGS

In order to make a clearer description of technical solutions in specific embodiments of the present application or prior art, drawings involved in description for the specific embodiments or the prior art will be briefly introduced, and apparently, the drawings described below illustrate some embodiments of the present application, for one with ordinary skill in the art, other drawings can also be obtained in accordance with these drawings without delivering creative efforts.

DETAILED DESCRIPTION

In order to make the purpose, technical solutions and advantages in embodiments of the present application clearer, the technical solutions in the embodiments of the present application will be described as follows clearly and completely in conjunction with the figures accompanying the embodiments of the present application, and surely, the described embodiments are just part rather than all embodiments of the present application. Based on the embodiments of the present application, all the other embodiments acquired by those skilled in the art without delivering creative efforts shall fall into the protection scope of the present application.

In the description of the present application, it should be noted that the terms "first", "second" and "third" are only used for descriptive purposes, and cannot be understood as indicating or implying relative importance.

Embodiment 1

Figure 1:
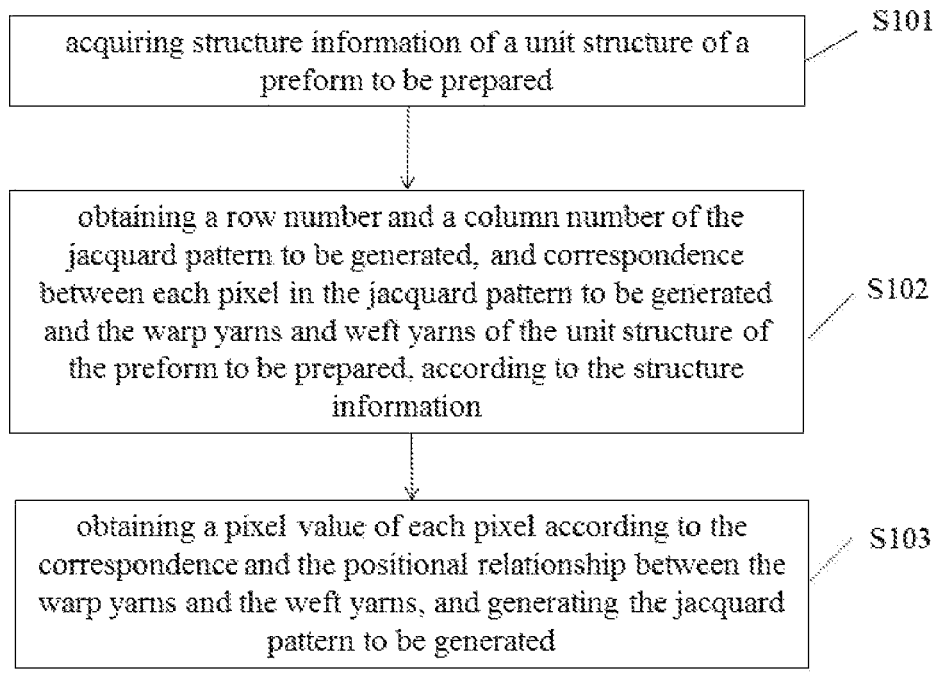
FIG. 1 is a method flow chart of a method for generating a jacquard pattern provided by an embodiment of the present application.

FIG. 1 shows a flow chart of a method for generating a jacquard pattern according to an embodiment of the present application. As shown in FIG. 1, the method may include the following steps:

S101: acquiring structure information of a unit structure of a preform to be prepared, wherein the structure information comprises a warp yarn column number, a warp yarn layer number, a weft yarn column number and a weft yarn layer number, as well as a positional relationship between the warp yarns and the weft yarns of the unit structure of a preform to be prepared.

Figure 2A:
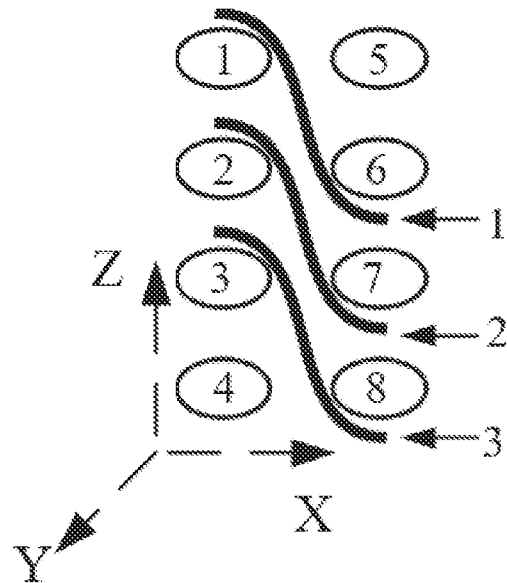
FIGS. 2A-2B are schematic diagrams of a unit structure of a preform to be prepared.
Figure 2B:
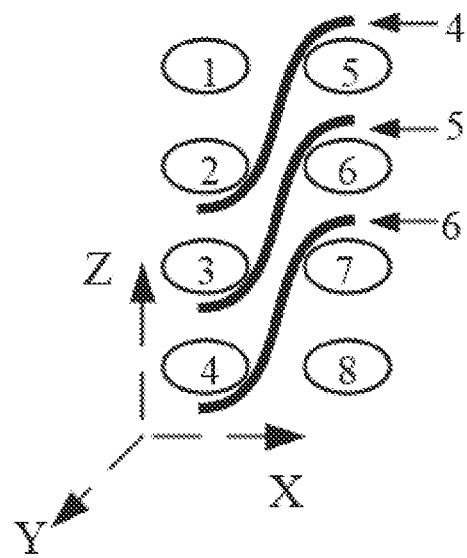

In this embodiment, the unit structure of the preform to be prepared is a three-dimensional woven structure, and hence comprises not only multiple columns and layers of warp yarns, but also multiple columns and layers of weft yarns. Specifically, FIG. 2A and FIG. 2B show a three-dimensional woven structure comprising 2 columns of warp yarns, each in 3 layers, and 2 columns of weft yarns, each in 4 layers. FIG. 2A shows the structure of the three-dimensional woven structure with the surface where the first column of warp yarns is located as the cross section, i.e., FIG. 2A shows the positional relationship between the first column of warp yarns (the first to third warp yarns) and eight weft yarns (in two columns and four layers), and FIG. 2B shows the structure of the three-dimensional woven structure when the surface of the second column of warp yarns is taken as the cross section, that is, FIG. 2B shows the positional relationship between the second column of warp yarns (the fourth to sixth warp yarns) and eight weft yarns (in two columns and four layers), and those skilled in the art should understand that in the actual three-dimensional woven structure, taking an coordinate system with the column direction of weft yarns shown in FIG. 2A as the Z-axis direction, and the layer direction of weft yarns as the X-axis direction as an example, the cross section shown in FIG. 2A and the cross section shown in FIG. 2B are two cross sections of the three-dimensional woven structure along the Y-axis direction.

In this embodiment, a matrix can be used to represent the warp yarn column number, the warp yarn layer number, the weft yarn column number and the weft yarn layer number, as well as the positional relationship between the warp yarns and the weft yarns of the unit structure of a preform to be prepared. Specifically, the warp yarn column number and the weft yarn column number can be denoted as a matrix L with 1 row and 2 columns: L=[2,2], where the matrix element in the first row and the first column of the matrix L represents the total column number of warp yarns in the preform, and the matrix element in the first row and the second column represents the total column number of weft yarns in the preform. The warp yarn layer number can be denoted as a matrix J with one row and two columns: J=[3,3], where the first column and the second column of the matrix J respectively represent the warp yarn layer number of the first column and the warp yarn layer number of the second column. The weft yarn layer number can be denoted as a matrix W with 1 row and 2 columns: W=[4,4], where the first column and the second column of matrix W represent the weft yarn layer number in the first column and the second column respectively. And the positional relationship between warp yarns and weft yarns can be denoted as a matrix P with 6 rows and 2 columns:

$$P = \begin{bmatrix} 0 & 2 \\ 1 & 1 \\ 1 & 1 \\ 2 & 0 \\ 1 & 1 \\ 1 & 1 \end{bmatrix}$$

Wherein, each row of the matrix P corresponds to each warp yarn and each column corresponds to each column of weft yarns. Matrix elements of matrix P indicate the number of weft yarns located between corresponding warp yarns and a previous layer of warp yarns of the corresponding warp yarns in corresponding weft yarn columns (if the corresponding warp yarns are the first layer of warp yarns, the number of weft yarns on the corresponding warp yarns is the number of weft yarns between the corresponding warp yarns and its previous layer of warp yarns of the corresponding warp yarns). For example, the first row and the first column in matrix P correspond to the positional relationship between the first warp yarn and the first column of weft yarns of the unit structure of the preform to be prepared; and the first row and the second column in matrix P correspond to the positional relationship between the first warp yarn and the second column of weft yarns of the unit structure of the preform to be prepared. The matrix element "0" at the intersection of the first row and the first column indicates that there is 0 weft yarn located above the first warp yarn in the first column of weft yarns (i.e. the first to fourth weft yarns in FIG. 2A), wherein the first warp yarn is the first layer of warp yarns in the first column of warp yarns). The matrix element "1" at the intersection of the second column and the second row indicates that there is one weft yarn directly located between the second warp yarn and the first warp yarn (wherein the first warp yarn is the previous layer of warp yarns of the second warp yarn) in the second column of weft yarns (that is, the fifth to eighth weft yarns in FIG. 2A).

It should be noted that, the specific name of the matrix, the specific correspondence between the rows and columns of the matrix and the warp yarns and weft yarns of the unit structure of the preform to be prepared, and the specific counting mode of the warp yarns and weft yarns of the unit structure of the preform to be prepared are all specific examples that are listed to facilitate those skilled in the art to understand the technical solutions of the embodiments of the present application, and should not constitute any restrictions on the technical solutions of the embodiments of the present application.

S102: obtaining a row number and a column number of the jacquard pattern to be generated, and correspondence between each pixel in the jacquard pattern to be generated and the warp yarns and weft yarns of the unit structure of the preform to be prepared, according to the structure information.

In an embodiment of the present application, the row number of the jacquard pattern to be generated can be obtained according to the weft yarn column number and the weft yarn layer number of the unit structure of the preform to be prepared, and the column number of the jacquard pattern to be generated can be obtained according to the warp yarn column number and the warp yarn layer number of the unit structure of the preform to be prepared. Specifically, the row number of the jacquard pattern to be generated can be a sum of the layer number of each column of weft yarns (i.e., the total number of weft yarns) of the unit structure of the preform to be prepared. And the column number of the jacquard pattern to be generated can be a sum of the layer number of each column of warp yarns (i.e., the total number of warp yarns) of the unit structure of the preform to be prepared. Taking the unit structure of the preform to be prepared in FIGS. 2A and 2B as an example, the jacquard pattern to be generated can have 8 rows and 6 columns.

In an embodiment of the present application, rows and columns in the jacquard pattern to be generate correspond to the warp yarns and weft yarns in the unit structure of the preform to be prepared one by one, and the pixel in the m-th row and n-th column in the jacquard pattern to be generated correspond to the m-th weft yarn and n-th warp yarn in the unit structure of the preform to be prepared.

In an embodiment of the present application, the column number of the jacquard pattern to be generated can also be obtained according to the warp yarn column number of the unit structure of the preform to be prepared and a preset number of layout yarns of a column of warp yarns in the jacquard pattern to be generated (the preset number of layout yarns is greater than or equal to the warp yarn layer number). Specifically, the row number of the jacquard pattern to be generated can still be the sum of layer number of each column of weft yarns (that is, the total number of weft yarns) of the unit structure of the preform to be prepared. And the column number of the jacquard pattern to be generated is a product of the warp yarn column number and the preset number of layout yarns of the unit structure of the preform to be prepared. Still, taking the unit structure of the preform to be prepared shown in FIGS. 2A and 2B as an example, if the preset number of layout yarns of a column of warp yarns in the jacquard pattern to be generated is 5, then the jacquard pattern to be generated can have 8 rows and 10 columns.

Figure 3:
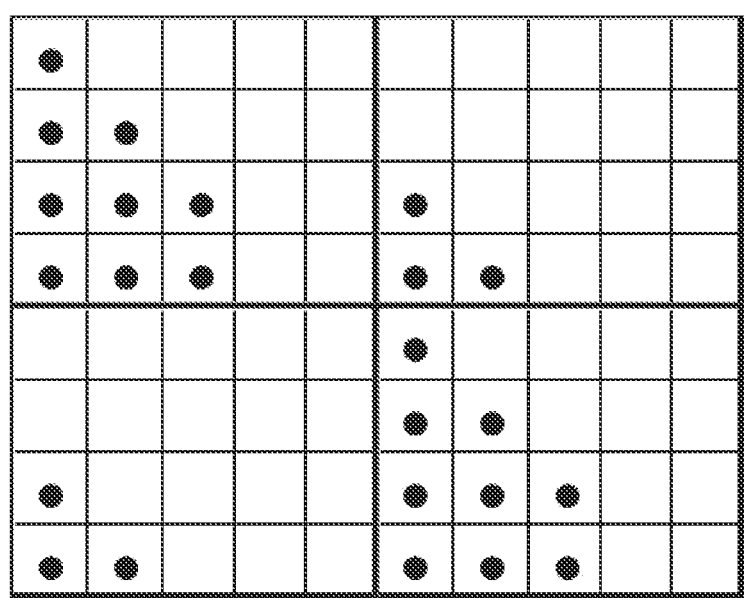
FIG. 3 is a jacquard pattern to be generated of the unit structure of the preform to be prepared in FIGS. 2A-2B.

In an embodiment of the present application, only some columns in the jacquard pattern to be generated correspond to warp yarns in the unit structure of the preform to be prepared one by one. Specifically, the columns corresponding to the preset number of layout yarns in the jacquard pattern to be generated are taken as a group, the number of groups in the jacquard pattern to be generated corresponds to the warp yarn column number in the unit structure of the preform to be prepared one by one, and there are no warp yarns corresponding to the columns among the group of columns in the jacquard pattern to be generated that exceed the warp yarn layer number in the unit structure of the preform to be prepared. Specifically, for example, if the unit structure of the preform to be prepared is as shown in FIG. 2A and FIG. 2B, and the preset number of layout yarns is 5, then as shown in FIG. 3, the first to fifth columns in the jacquard pattern to be generated are the first group, and corresponding to the first column of weft yarns, only the first to third columns have corresponding warp yarns (corresponding to the first to third warp yarns respectively), if the sixth to tenth columns in the jacquard pattern to be generated are the second group, then only the sixth to eighth columns have corresponding warp yarns (corresponding to the fourth to sixth warp yarns respectively).

S103: obtaining a pixel value of each pixel according to the correspondence and the positional relationship between the warp yarns and the weft yarns, and generating the jacquard pattern to be generated.

In an embodiment of the present application, the pixel value, comprising a first pixel value and a second pixel value, is equal to the first pixel value when the warp yarns corresponding to the pixel are located above corresponding weft yarns, and is equal to the second pixel value when the warp yarns corresponding to the pixel are located below corresponding weft yarns.

In an embodiment of the present application, if the column number of the jacquard pattern to be generated is obtained according to the warp yarn column number of the unit structure of the preform to be prepared and the preset number of layout yarns of a column of warp yarns in the jacquard pattern to be generated, that is, when there is a column in the jacquard pattern to be generated that has no corresponding warp yarns, the pixel value of the pixels of the column can be directly set as the first pixel value or the second pixel value. Specifically, for example, if the unit structure of the preform to be prepared is shown as the structure in FIGS. 2A and 2B, and the preset number of layout yarns of the preform to be prepared is 5, and if the color of corresponding pixels having the first pixel value is black, and the color of corresponding pixels having the second pixel value is white, then the generated jacquard pattern is shown in FIG. 3 (in order to reflect the edge of each pixel and facilitate the skilled person to understand the technical solution in the embodiment of the present application, the black blocks are replaced with black dots in FIG. 3).

In an embodiment of the present application, it should be noted that, the unit structure of the preform to be prepared can be used as a replicable structural unit of the preform to be prepared, and accordingly, the jacquard pattern of the preform to be prepared can be obtained by replicating the jacquard pattern of the unit structure of the preform to be prepared. At the same time, however, it should be noted that, although the unit structure of the preform to be prepared can be a replicable structural unit of the preform to be prepared, it is not required that all unit structures of the preform to be prepared contained in the preform to be prepared are complete structures (for example, each unit structure of the preform to be prepared contains 2 column of warp yarns, but the warp yarn columns contained in the preform to be prepared can also be odd-numbered columns such as 15 columns and 17 columns) If the preform to be prepared comprises an incomplete unit structure of the preform to be prepared, then the jacquard pattern corresponding to the incomplete unit structure of the preform to be prepared can be obtained by extracting a corresponding part of a jacquard pattern of complete unit structures of the preform to be prepared.

In the embodiment of the present application, the structure information of the unit structure of the preform to be prepared is obtained, wherein the structure information comprises a warp yarn column number, a warp yarn layer number, a weft yarn column number and a weft yarn layer number, as well as a positional relationship between the warp yarns and the weft yarns of the unit structure of a preform to be prepared, and data information which can describe the three-dimensional structure of the unit structure of the preform to be prepared is obtained, which makes data preparation for the subsequent generation of the jacquard pattern. And obtaining a row number and a column number of the jacquard pattern to be generated, and correspondence between each pixel in the jacquard pattern to be generated and the warp yarns and weft yarns of the unit structure of the preform to be prepared, according to the structure information enabling acquiring positional relationship between warp yarns and weft yarns corresponding to each pixel in the jacquard pattern to be generated from the structure information according to the correspondence, so as to define that when the warp yarns corresponding to the pixels are located above the corresponding weft yarns, the pixel values of the pixels are the first pixel value, and when the warp yarns corresponding to the pixels are located below the corresponding weft yarns, the pixel values of the pixels are the second pixel value, and finally the pixel value of each pixel of the jacquard pattern to be generated can be determined according to the correspondence and the positional relationship between the warp yarns and the weft yarns, thereby realizing generation of the jacquard pattern to be generated.

In the present application, what is requested to be manually operated is to provide structure information, that is, to provide a warp yarn column number, a warp yarn layer number, a weft yarn column number and a weft yarn layer number, as well as a positional relationship between the warp yarns and the weft yarns of the unit structure of a preform to be prepared, the workload and difficulty of manually confirming this information are smaller than that of coloring each pixel in the jacquard pattern. Therefore, the method for generating a jacquard pattern can improve the generation efficiency and accuracy of the generated jacquard pattern.

As an optional embodiment of the embodiment of the present application, a structure matrix is used to express the positional relationship between warp yarns and weft yarns, with rows in the structure matrix representing the total number of warp yarns, and columns in the structure matrix representing the number of weft yarns, and the elements in the structure matrix represent the number of weft yarns that are directly located above the corresponding warp yarns, for the corresponding warp yarns in the corresponding weft yarn columns (which can be understood with reference to the matrix P in the above step S101). The method for generating the jacquard pattern in the embodiment of the present application is described, for example, when the row number of the jacquard pattern to be generated is obtained according to the weft yarn column number and weft yarn layer number of the unit structure of the preform to be prepared, and the column number of the jacquard pattern to be generated is obtained according to the warp yarn column number and warp yarn layer number of the unit structure of the preform to be prepared, and step S103 may include the following steps:

S201: sequentially calculating a total number of weft yarns positioned on the s-th warp yarn in each column of weft yarns according to elements in the structure matrix, and obtaining pixel values of pixels in the s-th column of the jacquard pattern to be generated according to the total number of weft yarns.

In this embodiment, it is assumed that the s-th warp yarn is the q-th layer of warp yarns in the j-th column of warp yarns, that is, $$s(j, q) = \begin{cases} \sum_{t=1}^{j-1} J(t) + q, & j \geq 2 \\ q, & j = 1 \end{cases},$$

wherein the function J(t) refers to the value of the t-th column in the matrix J, that is, the layer number of the t-th column of warp yarns, which can be calculated by the following method to obtain the pixel value of each pixel in the jacquard pattern to be generated:

Step A: sequentially calculating the total number of weft yarns positioned on the s-th warp yarn in the i-th column of weft yarns according to elements in the structure matrix. Specifically, the total number of weft yarns can be obtained by calculating the sum of matrix elements from a row corresponding to the first layer of warp yarns in the j-th column of warp yarn to a row corresponding to the q-th layer of warp yarns in the j-th column of warp yarns in the i-th column of the structure matrix, i.e., by calculating the sum of matrix elements from the s(j,1)-th row to the s(j,q)-th row of the i-th column of the matrix structure.

Figure 4A:
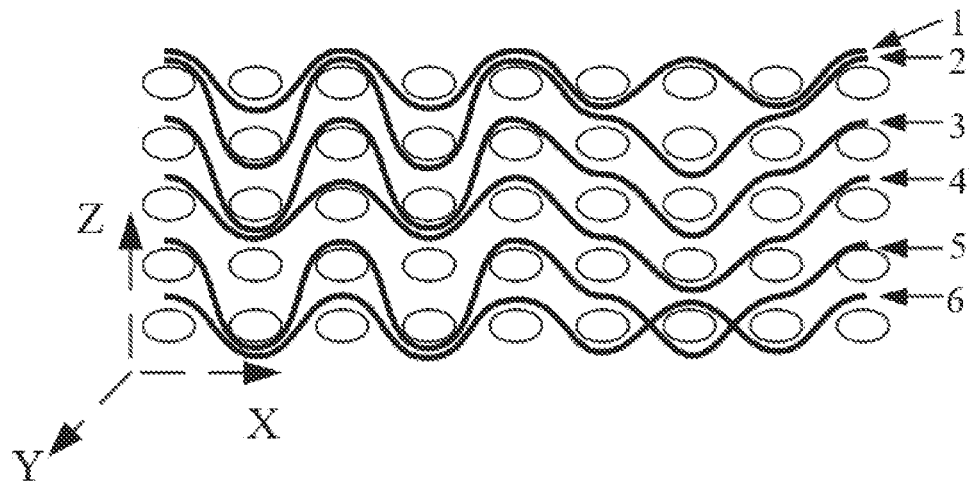
FIGS. 4A-4D are schematic structural diagrams of another preform unit of the preform to be prepared.
Figure 4B:
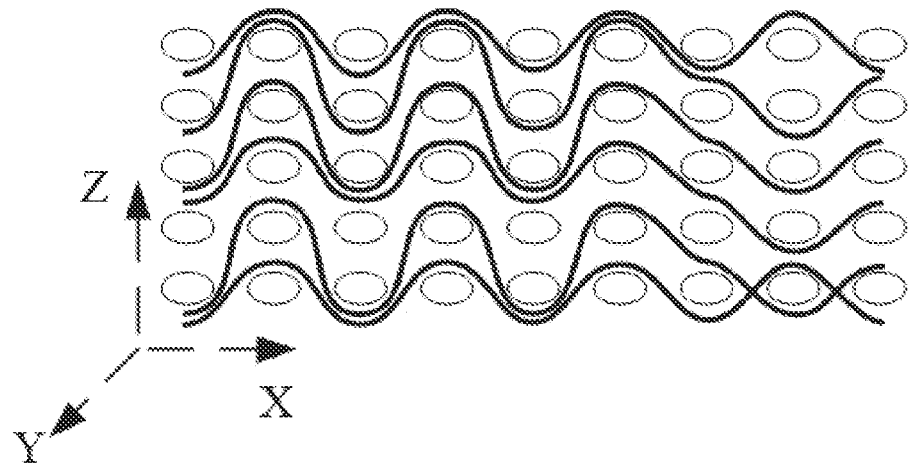
Figure 4C:
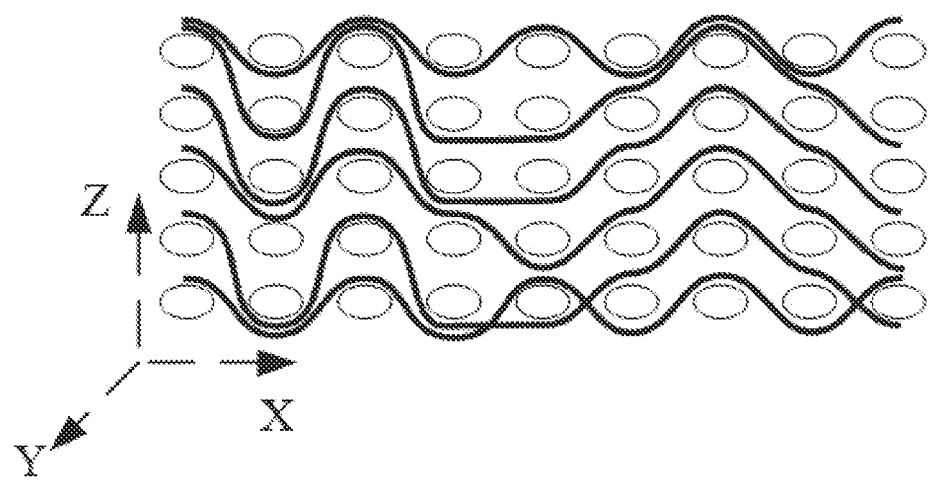
Figure 4D:
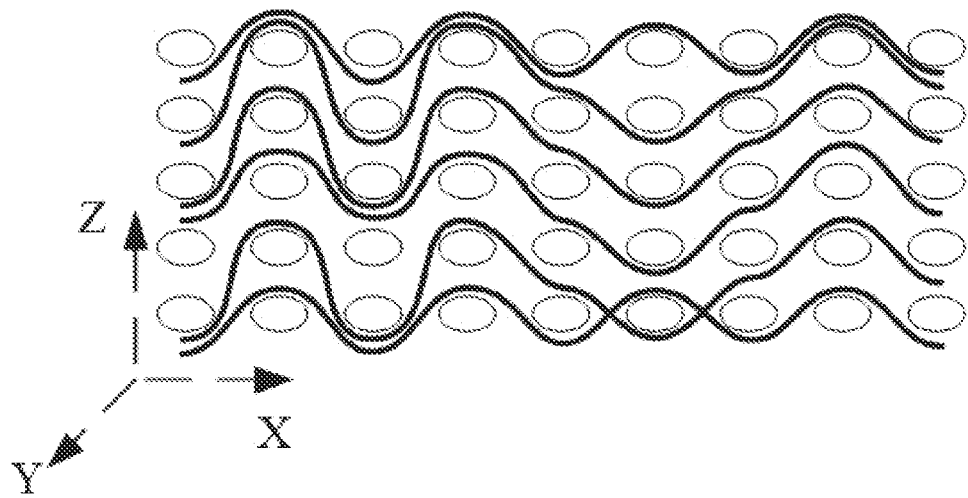

In an embodiment of the present application, description is made when the woven structure as shown in FIG. 4A-4D containing 4 columns of warp yarns, each column in 6 layers, and 9 columns of weft yarns, each column in 5 layers, is taken as the unit structure of the preform to be prepared (FIG. 4A shows the structure of the unit structure of the preform to be prepared when the surface where the first column of warp yarns is taken as the cross section, FIG. 4B shows the structure of the unit structure of the preform to be prepared when the surface where the second column of warp yarns is taken as the cross section, FIG. 4C shows the structure of the unit structure of the preform to be prepared when the surface where the third column of warp yarns is taken as the cross section, FIG. 4D shows the structure of the unit structure of the preform to be prepared when the surface where the fourth column of warp yarns is taken as the cross section), then as shown in FIGS. 4A-4D, the structure information of the unit structure of the preform to be prepared is as follows: the warp yarn column number and the weft yarn column number L=[4,9], the warp yarn layer number J=[6,6,6,6], the weft yarn layer number W=[5,5,5, 5,5,5,5,5,5], and the positional relationship between warp yarns and weft yarns:

$$P = \begin{bmatrix} 0 & 1 & 0 & 1 & 0 & 1 & 0 & 1 & 0 \\ 0 & 1 & 0 & 1 & 0 & 0 & 2 & 0 & 0 \\ 1 & 1 & 1 & 1 & 1 & 1 & 1 & 1 & 1 \\ 1 & 0 & 1 & 0 & 1 & 1 & 1 & 1 & 1 \\ 1 & 2 & 1 & 2 & 1 & 1 & 1 & 1 & 1 \\ 1 & 0 & 1 & 0 & 1 & 1 & -1 & 1 & 1 \\ 1 & 0 & 1 & 0 & 1 & 0 & 1 & 0 & 1 \\ 1 & 0 & 1 & 0 & 1 & 0 & 0 & 2 & 0 \\ 1 & 1 & 1 & 1 & 1 & 1 & 1 & 1 & 1 \\ 0 & 1 & 0 & 1 & 0 & 1 & 1 & 1 & 1 \\ 2 & 1 & 2 & 1 & 2 & 1 & 1 & 1 & 1 \\ 0 & 1 & 0 & 1 & 0 & 1 & 1 & -1 & 1 \\ 0 & 1 & 0 & 1 & 0 & 1 & 0 & 1 & 0 \\ 0 & 1 & 0 & 1 & 2 & 0 & 0 & 0 & 2 \\ 1 & 1 & 1 & 1 & 1 & 1 & 1 & 1 & 1 \\ 1 & 0 & 1 & 0 & 1 & 1 & 1 & 1 & 1 \\ 1 & 2 & 1 & 2 & 1 & 1 & 1 & 1 & 1 \\ 1 & 0 & 1 & 0 & -1 & 1 & 1 & 1 & -1 \\ 1 & 0 & 1 & 0 & 1 & 0 & 1 & 0 & 1 \\ 1 & 0 & 1 & 0 & 0 & 2 & 0 & 0 & 0 \\ 1 & 1 & 1 & 1 & 1 & 1 & 1 & 1 & 1 \\ 0 & 1 & 0 & 1 & 1 & 1 & 1 & 1 & 1 \\ 2 & 1 & 2 & 1 & 1 & 1 & 1 & 1 & 1 \\ 0 & 1 & 0 & 1 & 1 & -1 & 1 & 1 & 1 \end{bmatrix}$$

Wherein, the specific meanings of rows, columns and matrix elements in matrix L, matrix J, matrix W and matrix P can be understood referring to the specific contents in step S101, and will not be repeated herein (it should be noted that, the matrix element "−1" in the matrix P means that the warp yarn corresponding to the matrix element is above the previous layer of warp yarns of the corresponding warp yarns, and there is one weft yarn therebetween), then the total number of weft yarns located above the first warp yarn (the first layer of warp yarns in the first column of warp yarns) in the first column of weft yarns in the unit structure of the preform (the value of the first column and the first row in matrix P) to be prepared is 0; in the second column of weft yarns, the total number of weft yarns on the first warp yarn (the value of the second column and the first row in matrix P) is 1; . . . ; in the ninth column of weft yarns, the total number of weft yarns on the first warp yarn (the value of the ninth column and the first row in matrix P) is 0; . . . ; in the first column of weft yarns, the total number of weft yarns on the fifteenth warp yarn (the third layer of warp yarns in the third column of warp yarns, i.e. j=3, q=3, specifically, in the matrix P, the sum of the matrix elements of the s(3,1)-th (=6+6+1=13) row to the s(3,3)-th (=6+6+3=15) row in the first column is 0+0+1=1) is 1; in the second column of weft yarns, the total number of weft yarns on the fifteenth warp yarn (in the matrix P, the sum of the matrix elements of the thirteenth to fifteenth row in the second column is 1+1+1=3) is 3; . . . ; in the ninth column of weft yarns, the total number of weft yarns on the fifteenth warp yarn (in the matrix P, the sum of the matrix elements of the thirteenth to fifteenth row in the ninth column is 0+2+1=3) is 3, and so on.

Step B: obtaining pixel values of pixels corresponding to each layer of weft yarns in the s-th column of weft yarns to the i-th column of weft yarns in the jacquard pattern to be generated according to the total number of weft yarns and the number of layers of the i-th column of weft yarns.

Specifically, when i=1, the pixels of the s-th column of the jacquard pattern to be generated corresponding to each weft yarn in the i-th column of weft yarns are pixels in the first row to the W(1) row in the s-th column (W(1) refers to the value of the first column in the matrix W, that is, the number of layers of weft yarns in the first column), when i≥2 the pixels of the s-th column of the jacquard pattern to be generated corresponding to each weft yarn in the i-th column of weft yarns are pixels in the $$\sum_{t=1}^{i-1} W(t) + 1\text{-th}$$

row to the $$\sum_{t=1}^{i} W(t)\text{-th}$$

row in the s-th column, wherein the function W(t) refers to the value of the t-th column in the matrix W, i.e., the number of layers of weft yarns in the t-th column. Specifically, if the total number of weft yarns obtained in step A is p, then the weft yarns in the first layer to the p-th layer in the i-th column of weft yarns are located above the s-th warp yarn, that is, the pixel values of the pixels corresponding to the first layer to the p-th layer of weft yarns in the i-th column of weft yarns are the second pixel value, and the pixel values of pixels corresponding to other layers of weft yarns in the i-th column of weft yarns are the first pixel value, that is, when i=1, among the pixels in the i-th column of the jacquard pattern to be generated corresponding to each weft yarn in the i-th column of weft yarns, the pixel values of the pixels from the first row to the p-th row of the s-th column are the second pixel value, and the pixel values of the pixels from the (p+1)-th row to the W(1) row are the first pixel value, and when i≥2, the pixel values of the pixels from the $$\sum_{t=1}^{i-1} W(t) + 1\text{-th}$$

row to me $$\sum_{t=1}^{i-1} W(t) + p\text{-th}$$

row of the i-th column of the jacquard pattern to be generated are the second pixel value, and the pixel values from the $$\sum_{t=1}^{i-1} W(t) + p + 1\text{-th}$$

row to the $$\sum_{t=1}^{i-1} W(t) + 1\text{-th}$$

row are the first pixel value.

Figure 5:
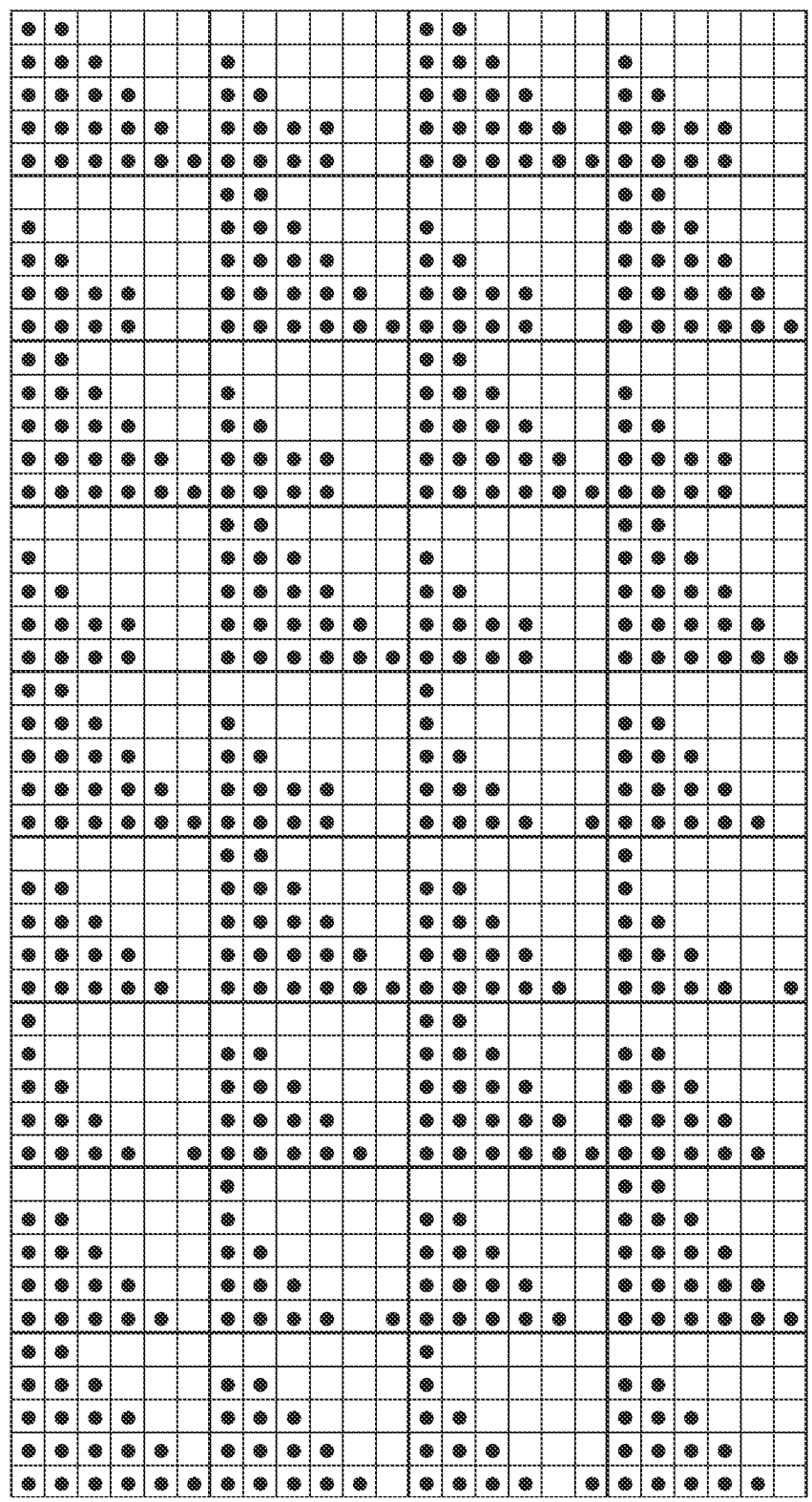
FIG. 5 is a jacquard pattern to be generated of a unit structure of a preform to be prepared in FIGS. 4A-4D.

Following the above example, if the unit structure of the preform to be prepared is the structure shown in FIGS. 4A-4D, then the woven structure to be generated corresponding to the unit structure of the preform to be prepared is shown in FIG. 5. Specifically, since the total number of weft yarns located above the first warp yarn in the first column of weft yarns is 0, the corresponding pixel values of the pixels in the first to fifth rows in the first column of the jacquard pattern to be generated are all the first pixel value (shown by black dots in FIG. 5). Since the total number of weft yarns located above the first warp yarn in the second column of weft yarns is 1, the pixel values of the pixels in the first to sixth rows of the corresponding jacquard pattern to be generated are the first pixel value (shown in white in FIG. 5), and the pixel values of pixels in the seventh to tenth rows in the first column are all the first pixel value. Since the total number of weft yarns on the 15th warp yarn in the 9th column of weft yarns is 3, the pixel values of the corresponding 41th-43rd rows in the 15th column of the jacquard pattern to be generated are the second pixel value (shown in white in FIG. 5), and the pixel values of the pixels of the 44th-45th rows in the 1st column are all the first pixel values. And so on.

Step C: Generating a Jacquard Pattern to be Generated after Obtaining the Pixel Values of all Pixels of the Jacquard Pattern to be Generated.

Figure 6:
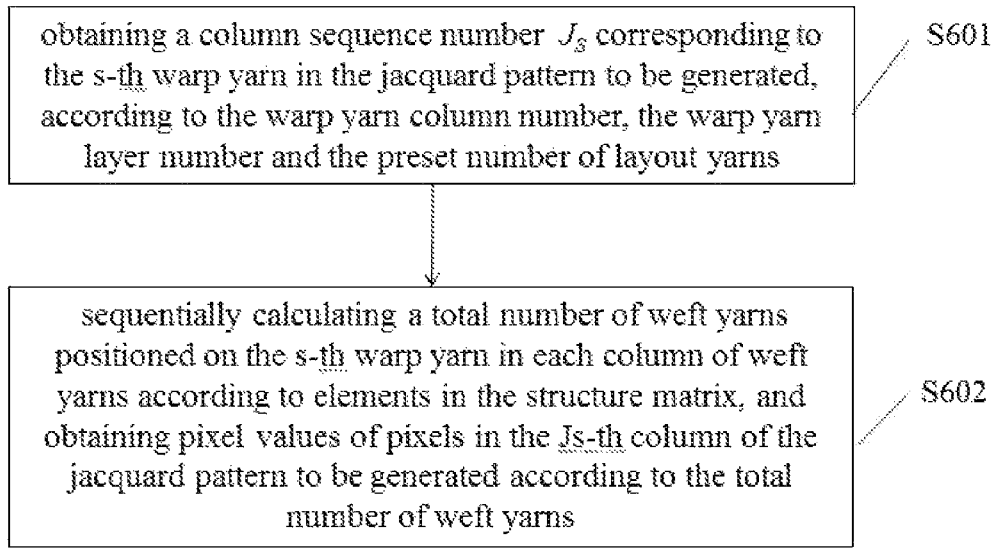
FIG. 6 is a specific flow chart of step S103 in FIG. 1.

As an optional embodiment of the embodiment of the present application, a structure matrix is used to express the positional relationship between warp yarns and weft yarns, with rows in the structure matrix representing the total number of warp yarns, and columns in the structure matrix representing the number of weft yarns, and the elements in the structure matrix represent the number of weft yarns that are directly located above corresponding warp yarns, for the corresponding warp yarns in the corresponding weft yarn columns (which can be understood with reference to the matrix P in the above step S101). The row number of the jacquard pattern to be generated is obtained according to the weft yarn layer number and the weft yarn column number of the unit structure of the preform to be prepared, and the column number of the jacquard pattern to be generated is obtained according to warp yarn column number of the unit structure of the preform to be prepared and the preset number of layout yarns of a column of warp yarns in the jacquard pattern to be generated. The method for generating the jacquard pattern in the embodiment of the present application is described, taking the preset number of layout yarns being greater than or equal to the warp yarn layer number as an example, then as shown in FIG. 6, Step S103 may include the following steps:

S601: obtaining a column sequence number $J_s$ corresponding to the s-th warp yarn in the jacquard pattern to be generated, according to the warp yarn column number, the warp yarn layer number and the preset number of layout yarns.

In an embodiment of the present application, similarly, the s-th warp yarn is the q-th layer of warp yarns in the j-th column of warp yarns, that is, $$s(j, q) = \begin{cases} \sum_{t=1}^{j-1} J(t) + q, & j \geq 2 \\ q, & j = 1 \end{cases},$$

wherein the function J(t) refers to the value of the t-th column in the matrix J, i.e., the layer number of the t-th column of warp yarns. Accordingly, in the jacquard pattern to be generated, the column sequence number corresponding to the s-th warp yarn is $$J_s(j, q) = \begin{cases} \sum_{t=1}^{j-1} J_c(t) + q, & j \geq 2 \\ q, & j = 1 \end{cases},$$

wherein the function $J_c(t)$ refers to the preset number of layout yarns of the t-th column of warp yarns in the jacquard pattern to be generated.

S602: sequentially calculating a total number of weft yarns positioned on the s-th warp yarn in each column of weft yarns according to elements in the structure matrix, and obtaining pixel values of pixels in the $J_s$-th column of the jacquard pattern to be generated according to the total number of weft yarns.

In an embodiment of the present application, the total number of weft yarns located above the s-th warp yarn in a column of weft yarns is the sum of matrix elements from a row corresponding to the first layer of warp yarns in the j-th column of warp yarn to a row corresponding to the q-th layer of warp yarns in the j-th column of warp yarns in the columns corresponding to the structure matrix.

In an embodiment of the present application, the pixel values of pixels of the columns having no corresponding warp yarns in the jacquard pattern to be generated can be directly set as the first pixel value or the second pixel value, and the specific calculation method of the pixel value of pixels of the columns having corresponding warp yarns can be understood with reference to the specific content of the above step S201, which is not repeated here.

Figure 7:
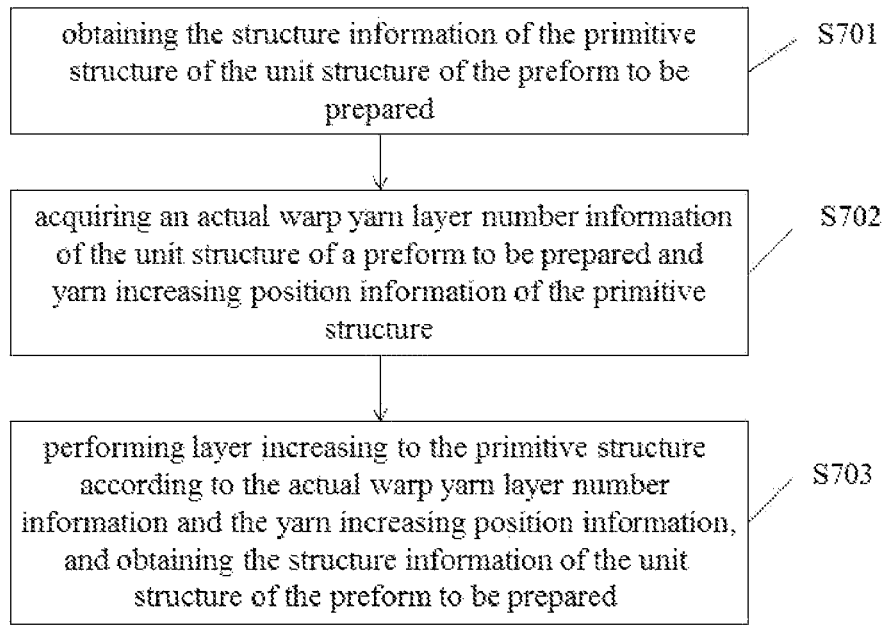
FIG. 7 is a specific flow chart of step S101 in FIG. 1.

As an optional embodiment of the embodiment of the present application, if the unit structure of the preform to be prepared is a regular weave structure (for example, the weave structures described in FIGS. 2A-2B are regular weave structures, while the weave structures shown in FIGS. 4A-4D are irregular weave structures), and the unit structure of the preform to be prepared comprises plural layers (for example, the positional relationship between warp and weft yarns in the unit structure of the preform to be prepared is the same as that shown in FIGS. 2A-2B, but the layer number of warp yarns is greater than 3, and the layer number of weft yarns is greater than 4), as shown in FIG. 7, step S101 may include the following steps:

S701: obtaining the structure information of the primitive structure of the unit structure of the preform to be prepared.

In the embodiment of the present application, the structure information of the primitive structure includes the warp yarn column number, the warp yarn layer number, the weft yarn column number and the weft yarn layer number, as well as the positional relationship between the warp yarns and the weft yarns of the primitive structure.

In an embodiment of the present application, the primitive structure of the unit structure of the preform to be prepared refers to the minimum structure that can be used to express the positional relationship between warp yarns and weft yarns in the unit structure of the preform to be prepared. Specifically, the structures shown in FIGS. 2A-2B can be viewed as a primitive structure of the unit structure of the preform to be prepared, having a positional relationship between warp yarns and weft yarns the same as that shown in FIGS. 2A-2B, but having plural layers of both the warp yarns and weft yarns (more than 3 layers of warp yarns and more than 4 layers of weft yarns).

In an embodiment of the present application, referring to the content described in step S101 above, it can be known that the structure information of the primitive structure shown in FIGS. 2A-2B is as follows: the warp yarn column number and the warp yarn column number L=[2,2], the warp yarn layer number J=[3,3], and the weft yarn layer number W=[4,4], and the positional relationship between warp yarns and weft yarns is $$P = \begin{bmatrix} 0 & 2 \\ 1 & 1 \\ 1 & 1 \\ 2 & 0 \\ 1 & 1 \\ 1 & 1 \end{bmatrix}.$$

Wherein, the specific meanings of rows, columns and matrix elements in matrix L, matrix J, matrix W and matrix P can be understood referring to the specific contents in step S101, and will not be repeated herein.

S702: acquiring an actual warp yarn layer number information of the unit structure of a preform to be prepared and yarn increasing position information of the primitive structure.

In an embodiment of the present application, because the unit structure of the preform to be prepared has the same structure as the primitive structure, the relationship between the warp yarn layer number and weft yarn layer number in the unit structure of the preform to be prepared is the same as that between the warp yarn layer number and weft yarn layer number in the primitive structure, and the relationship between the warp yarn layer number and weft yarn layer number can be obtained according to the structure information of the primitive structure. Therefore, after obtaining the actual warp yarn layer number information of the unit structure of a preform to be prepared, the actual weft yarn layer number information of the unit structure of a preform to be prepared can be obtained according to the actual warp yarn layer number information. Specifically, following the above example, it can be learned from the structure information of the primitive structure shown in FIGS. 2A-2B that, the primitive structure has one layer of weft yarns more than the warp yarns.

In an embodiment of the present application, the yarn increasing position information of the primitive structure mainly refers to warp yarn increasing position information (weft yarns automatically increase with the increase of warp yarns). Specifically, the warp yarn increasing position is generally the middle layer of warp yarns of each column of warp yarns. Following the above example, the warp yarn increasing position of the primitive structure shown in FIGS. 2A-2B is below the second layer of warp yarns of each column of warp yarns, and if h is used to represent the yarn increasing position information, then h=2.

S703: performing layer increasing to the primitive structure according to the actual warp yarn layer number information and the yarn increasing position information, and obtaining the structure information of the unit structure of the preform to be prepared.

In an embodiment of the present application, the actual layer number of the warp yarns to be increased $n_d$ (i.e., the layer number of the weft yarns to be increased) can be obtained according to the actual warp yarn layer number information and the warp layer number in the primitive structure, so as to obtain actual weft yarn layer number information of the unit structure of a preform to be prepared, then a matrix of $n_d \times m$ with elements of 1 ((m refers to the actual weft yarn column number of the unit structure of a preform to be prepared, i.e., the weft yarn column number of the primitive structure) is inserted below the h-th layer in each column of warp yarns corresponding to the positional relationship matrix P of the warp yarns and the weft yarns, thereby obtaining a positional relationship matrix $P_0$ of the warp yarns and the weft yarns of the unit structure of a preform to be prepared.

Following the above example, if the primitive structure of the unit structure of the preform to be prepared is as shown in FIGS. 2A-2B, and the actual warp yarn layer number of the unit structure of the preform to be prepared is 5 ($n_d$=2), and the warp yarn increasing position is below the second layer of warp yarns in each column of warp yarns (h=2), then the warp yarn column number and the weft yarn column number ( 原文 也许写成复了，请与发明人沟通 ) of the unit structure of the preform to be prepared are: $L_0$=[2,2], the warp yarn layer number is $J_0$=[5,5], the weft yarn layer number is $W_0$=[6,6], and the positional relationship matrix $P_0$ of warp yarns and weft yarns in the unit structure of the preform to be prepared can be obtained by inserting a matrix of 2×2 with elements of 1 below the second row (the row in the matrix P corresponding to the second layer in the first column of warp yarns) and the fifth row (the row in the matrix P corresponding to the second layer in the second column of warp yarns) in the matrix P, i.e., $$P_0 = \begin{bmatrix} 0 & 2 \\ 1 & 1 \\ 1 & 1 \\ 1 & 1 \\ 1 & 1 \\ 2 & 0 \\ 1 & 1 \\ 1 & 1 \\ 1 & 1 \end{bmatrix}.$$

Figure 8:
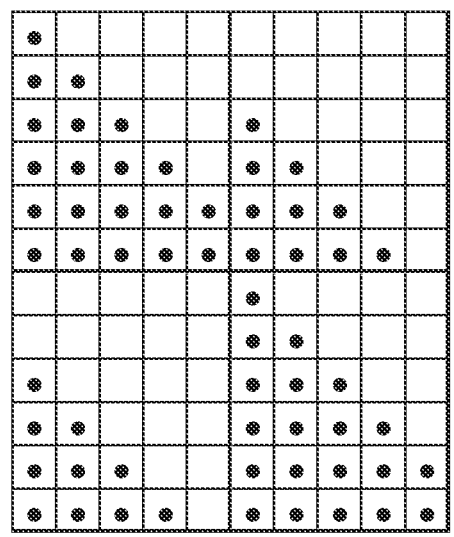
FIG. 8 is a jacquard pattern to be generated of a unit structure of a preform to be prepared obtained after the structure in FIGS. 2A-2B is increased as a primitive tissue.

In an embodiment of the present application, the jacquard pattern of the unit structure of the preform to be prepared obtained after the above-mentioned layer increasing is shown in FIG. 8.

Embodiment 2

Figure 9:
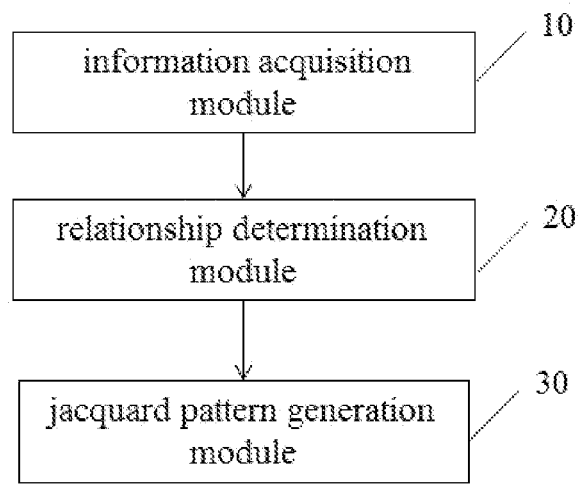
FIG. 9 is a schematic block diagram of a device for generating a jacquard pattern provided by an embodiment of the present application.

FIG. 8 shows a schematic block diagram of a device for generating a jacquard pattern according to an embodiment of the present application, which can be used to realize the method for generating a jacquard pattern described in embodiment 1 or any optional embodiment thereof. As shown in FIG. 9, the device includes an information acquisition module 10, a relationship determination module 20 and a jacquard pattern generation module 30.

The information acquisition module 10 is used to acquire structure information of a unit structure of a preform to be prepared, in an embodiment of the present application, the structure information comprises a warp yarn column number, a warp yarn layer number, a weft yarn column number and a weft yarn layer number, as well as a positional relationship between the warp yarns and the weft yarns of the unit structure of a preform to be prepared. For details, please refer to the related description of step S101 of the above method embodiment.

The relationship determination module 20 is used to obtain a row number and a column number of the jacquard pattern to be generated, and correspondence between each pixel in the jacquard pattern to be generated and the warp yarns and weft yarns of the unit structure of the preform to be prepared, according to the structure information. For details, please refer to the related description of step S102 of the above method embodiment.

The jacquard pattern generation module 30 is used to obtain a pixel value of each pixel according to the correspondence and the positional relationship between the warp yarns and the weft yarns, and generating the jacquard pattern to be generated, in an embodiment of the present application, the pixel value, comprising a first pixel value and a second pixel value, is equal to the first pixel value when the warp yarns corresponding to the pixel are located above corresponding weft yarns, and is equal to the second pixel value when the warp yarns corresponding to the pixel are located below corresponding weft yarns.

In an embodiment of the present application, the jacquard pattern to be generated of the unit structure of the preform to be prepared can be automatically generated by executing the program or instruction corresponding to the above module, wherein what is requested to be manually operated is to provide structure information, that is, to provide a warp yarn column number, a warp yarn layer number, a weft yarn column number and a weft yarn layer number, as well as a positional relationship between the warp yarns and the weft yarns of the unit structure of a preform to be prepared, the workload and difficulty of manually confirming this information are smaller than that of coloring each pixel in the jacquard pattern. Therefore, the method for generating a jacquard pattern can improve the generation efficiency and accuracy of the generated jacquard pattern.

Embodiment 3

Figure 10:
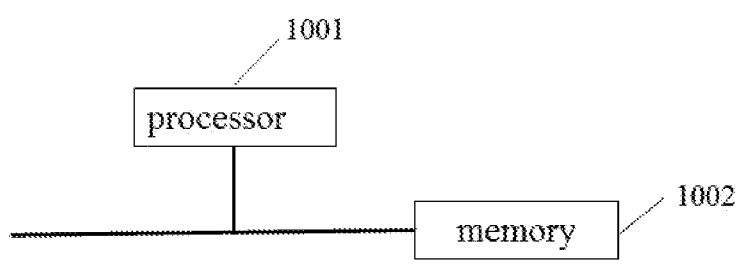
FIG. 10 is a schematic diagram of the hardware structure of an electronic device provided by an embodiment of the present application.

An embodiment of the present application provides an electronic device. As shown in FIG. 10, the electronic device may include a processor 1001 and a memory 1002, which may be connected by bus or other means. In FIG. 10, the connection by bus is taken as an example.

The processor 1001 may be a Central•Processing•Unit (CPU). The processor 1001 can also be other general-purpose processors, Digital Signal Processor (DSP), Application Specific Integrated Circuit (ASIC), Field-Programmable Gate Array (FPGA), or other programmable logic devices, discrete gates or transistor logic devices, discrete hardware components and other chips, or combinations of the above-mentioned chips.

As a non-transient computer readable storage medium, the memory 1002 can be used to storing non-transient software programs, non-transient computer executable programs and modules, such as program instructions/modules corresponding to the method for generating a jacquard pattern in the embodiments of the present application. The processor 1001 executes various functional applications and data processing of the processor by running non-transient software programs, instructions and modules stored in the memory 1002, i.e., realizes the method for generating a jacquard pattern in the above method embodiments.

The memory 1002 may include a storage program area and a storage data area, wherein the storage program area may store an application program required by an operating system and at least one function; the storage data area may store data created by the processor 1001 and the like. In addition, the memory 1002 may include high-speed random access memory, and may also include non-transient memory, such as at least one disk memory device, flash memory device, or other non-transient solid-state memory devices. In some embodiments, the memory 1002 may optionally include memories remotely located relative to the processor 1001, and these remote memories may be connected to the processor 1001 through a network. Examples of the above networks include, but are not limited to, the Internet, corporate intranet, local area network, mobile communication network and combinations thereof.

The one or more modules are stored in the memory 1002, and when executed by the processor 1001, the method for generating a jacquard pattern in the embodiments shown in FIGS. 1-8 is executed.

The specific details of the above electronic device can be understood by referring to the corresponding descriptions and effects in the embodiments shown in FIGS. 1 to 8, and will not be repeated herein.

It can be understood by those skilled in the art that all or part of the processes in the methods of the above embodiments can be completed by instructing related hardware through a computer program, which can be stored in a computer-readable storage medium, and when executed, can include the processes of the embodiments of the above methods. The storage medium may be a magnetic disk, an optical disk, or a Read-Only memory (ROM), Random Access Memory (RAM), Flash-Memory, Hard Disk Drive (HDD) or Solid State Drive (SSD), etc., and the storage medium may also include a combination of the above kinds of memories.

Obviously, the above-mentioned embodiments are only examples for clear explanation, and are not a limitation of the embodiment. For those of ordinary skill in the field, other changes or variations in different forms can be made on the basis of the above description. It is unnecessary and impossible to exhaust all embodiment. The obvious changes or variations derived herefrom still fall in the protection scope of the present application.

The invention claimed is:

1. A method for generating a jacquard pattern, comprising the following steps:
   acquiring structure information of a unit structure of a preform to be prepared, wherein the structure information comprises a warp yarn column number, a warp yarn layer number, a weft yarn column number and a weft yarn layer number, as well as a positional relationship between the warp yarns and the weft yarns of the unit structure of the preform to be prepared, wherein, a structure matrix is used to represent the positional relationship between the warp yarns and weft yarns, wherein a row number of the structure matrix represents a total number of warp yarns, a column number of the structure matrix represents a column number of weft yarns, and elements in the structure matrix represent the number of weft yarns located between corresponding warp yarns and a previous layer of warp yarns of the corresponding warp yarns in corresponding weft yarn columns;

obtaining a row number and a column number of the jacquard pattern to be generated, and correspondence between each pixel in the jacquard pattern to be generated and the warp yarns and weft yarns of the unit structure of the preform to be prepared, according to the structure information; and obtaining a pixel value of each pixel according to the correspondence and the positional relationship between the warp yarns and the weft yarns, and generating the jacquard pattern to be generated; wherein, the pixel value, comprising a first pixel value and a second pixel value, is equal to the first pixel value when the warp yarns corresponding to the pixel are located above corresponding weft yarns, and is equal to the second pixel value when the warp yarns corresponding to the pixel are located below corresponding weft yarns;

wherein, when rows and columns in the jacquard pattern to be generated correspond to the warp yarns and weft yarns in the unit structure of the preform to be prepared one by one, the pixel in an m-th row and an n-th column in the jacquard pattern to be generated correspond to an m-th weft yarn and an n-th warp yarn in the unit structure of the preform to be prepared, the step of obtaining the pixel value of each pixel according to the correspondence and the positional relationship between the warp yarns and the weft yarns, and generating the jacquard pattern to be generated comprises:

sequentially calculating the total number of weft yarns positioned on an s-th warp yarn in each column of weft yarns according to the elements in the structure matrix, and obtaining pixel values of an s-th column of pixels in the jacquard pattern to be generated according to the total number of weft yarns, wherein the s-th warp yarn is a q-th layer of warp yarns in a j-th column of warp yarns in the unit structure of the preform to be prepared, and for a column of weft yarns, the total number of weft yarns located above the s-th warp yarn is a sum of matrix elements in a row corresponding to a first-layer warp yarn in the j-th column of warp yarns to a row corresponding to the q-th layer of warp yarns in the j-th column of warp yarns in the columns corresponding to the structure matrix;

wherein the pixel value of each pixel in the jacquard pattern to be generated is calculated in the following manner:

sequentially calculating the total number of weft yarns positioned on the s-th warp yarn in an i-th column of weft yarns according to the elements in the structure matrix;

obtaining pixel values of pixels in the s-th column of the jacquard pattern to be generated corresponding to each layer of weft yarns in the i-th column of weft yarns according to the total number of weft yarns and the number of layers of the i-th column of weft yarns;

generating the jacquard pattern to be generated after obtaining the pixel values of all pixels of the jacquard pattern to be generate;

wherein the step of acquiring the structure information of the unit structure of the preform to be prepared comprises:

acquiring structure information of a primitive structure of the unit structure of the preform to be prepared, the structure information of the primitive structure comprises a warp yarn column number, a warp yarn layer number, a weft yarn column number and a weft yarn layer number, as well as a positional relationship between the warp yarns and the weft yarns of the primitive structure;

acquiring an actual warp yarn layer number information of the unit structure of the preform to be prepared and yarn increasing position information of the primitive structure, wherein the yarn increasing position information indicates a warp yarn increasing position at a middle layer of warp yarns of each column of warp yarns, and the weft yarns automatically increase with the increase of the warp yarns; and performing layer increasing to the primitive structure according to the actual warp yarn layer number information and the yarn increasing position information, and obtaining the structure information of the unit structure of the preform to be prepared, wherein the layer increasing is performed by inserting a matrix of $n_d \times m$ with elements of 1 at the warp yarn increasing position, where $n_d$ is a layer number of the warp yarns to be increased, which is obtained according to the warp yarn layer number of the primitive structure and the actual warp yarn layer number information of the unit structure, and m is the weft yarn column number of the primitive structure.

2. The method for generating the jacquard pattern of claim 1, wherein, when only some columns in the jacquard pattern to be generated correspond to the warp yarns in the unit structure of the preform to be prepared one by one, the row number of the jacquard pattern to be generated is obtained according to the weft yarn layer number and the weft yarn column number of the unit structure of the preform to be prepared, and the column number of the jacquard pattern is obtained according to the warp yarn column number of the unit structure of the preform to be prepared and a preset number of layout yarns of a column of warp yarns in the jacquard pattern to be generated, and the preset number of layout yarns is greater than or equal to the warp yarn layer number.

3. The method for generating the jacquard pattern of claim 2, wherein, the step of obtaining the pixel value of each pixel according to the correspondence and the positional relationship between the warp yarns and the weft yarns and generating the jacquard pattern to be generated comprises:

obtaining a column sequence number $J_s$ corresponding to the s-th warp yarn in the jacquard pattern to be generated, according to the warp yarn column number, the warp yarn layer number and the preset number of layout yarns, wherein the s-th warp yarn is the q-th layer of warp yarns in the j-th column of warp yarns in the unit structure of the preform to be prepared; and sequentially calculating a total number of weft yarns positioned on the s-th warp yarn in each column of weft yarns according to the elements in the structure matrix, and obtaining pixel values of pixels in the $J_s$-th column of the jacquard pattern to be generated according to the total number of weft yarns; for a column of weft yarns, the total number of weft yarns on the s-th warp yarn is the sum of matrix elements from a row corresponding to the first layer of warp yarns in the j-th column of warp yarns to a row corresponding to the q-th layer of warp yarns in the j-th column of warp yarns in the columns corresponding to the structure matrix.

4. An electronic device, comprising:
memory and a processor, which are in communication connection with each other, wherein the memory stores computer instructions therein, and the processor executes the method for generating the jacquard pattern according to claim 1 by executing the computer instructions.

5. A device for generating a jacquard pattern, comprising:
an information acquisition module, used for acquiring structure information of a unit structure of a preform to be prepared, wherein the structure information comprises a warp yarn column number, a warp yarn layer number, a weft yarn column number and a weft yarn layer number, as well as a positional relationship between the warp yarns and the weft yarns of the unit structure of the preform to be prepared, wherein, a structure matrix is used to represent the positional relationship between the warp yarns and weft yarns, wherein a row number of the structure matrix represents a total number of warp yarns, a column number of the structure matrix represents a column number of weft yarns, and elements in the structure matrix represent the number of weft yarns located between corresponding warp yarns and a previous layer of warp yarns of the corresponding warp yarns in corresponding weft yarn columns;
a relationship determination module, used for obtaining a row number and a column number of the jacquard pattern to be generated, and correspondence between each pixel in the jacquard pattern to be generated and the warp yarns and weft yarns of the unit structure of the preform to be prepared, according to the structure information;
a jacquard pattern generation module, used for obtaining a pixel value of each pixel according to the correspondence and the positional relationship between the warp yarns and the weft yarns, and generating the jacquard pattern to be generated, wherein the pixel value, comprising a first pixel value and a second pixel value, is equal to the first pixel value when the warp yarns corresponding to the pixel are located above corresponding weft yarns, and is equal to the second pixel value when the warp yarns corresponding to the pixel are located below corresponding weft yarns;
wherein, when rows and columns in the jacquard pattern to be generated correspond to the warp yarns and weft yarns in the unit structure of the preform to be prepared one by one, the pixel in an m-th row and an n-th column in the jacquard pattern to be generated correspond to an m-th weft yarn and an n-th warp yarn in the unit structure of the preform to be prepared, the step of obtaining the pixel value of each pixel according to the correspondence and the positional relationship between the warp yarns and the weft yarns, and generating the jacquard pattern to be generated comprises:
sequentially calculating the total number of weft yarns positioned on an s-th warp yarn in each column of weft yarns according to the elements in the structure matrix, and obtaining pixel values of an s-th column of pixels in the jacquard pattern to be generated according to the total number of weft yarns, wherein the s-th warp yarn is a q-th layer of warp yarns in a j-th column of warp yarns in the unit structure of the preform to be prepared, and for a column of weft yarns, the total number of weft yarns located above the s-th warp yarn is a sum of matrix elements in a row corresponding to a first-layer warp yarn in the j-th column of warp yarns to a row corresponding to the q-th layer of warp yarns in the j-th column of warp yarns in the columns corresponding to the structure matrix;
wherein the pixel value of each pixel in the jacquard pattern to be generated is calculated in the following manner:
sequentially calculating the total number of weft yarns positioned on the s-th warp yarn in an i-th column of weft yarns according to the elements in the structure matrix;
obtaining pixel values of pixels in the s-th column of the jacquard pattern to be generated corresponding to each layer of weft yarns in the i-th column of weft yarns according to the total number of weft yarns and the number of layers of the i-th column of weft yarns;
generating the jacquard pattern to be generated after obtaining the pixel values of all pixels of the jacquard pattern to be generated,
wherein the step of acquiring the structure information of the unit structure of the preform to be prepared comprises:
acquiring structure information of a primitive structure of the unit structure of the preform to be prepared, the structure information of the primitive structure comprises a warp yarn column number, a warp yarn layer number, a weft yarn column number and a weft yarn layer number, as well as a positional relationship between the warp yarns and the weft yarns of the primitive structure;
acquiring an actual warp yarn layer number information of the unit structure of the preform to be prepared and yarn increasing position information of the primitive structure, wherein the yarn increasing position information indicates a warp yarn increasing position at a middle layer of warp yarns of each column of warp yarns, and the weft yarns automatically increase with the increase of the warp yarns; and
performing layer increasing to the primitive structure according to the actual warp yarn layer number information and the yarn increasing position information, and obtaining the structure information of the unit structure of the preform to be prepared, wherein the layer increasing is performed by inserting a matrix of $n_d \times m$ with elements of 1 at the warp yarn increasing position, where $n_d$ is a layer number of the weft yarns to be increased, which is obtained according to the warp yarn layer number of the primitive structure and the actual warp yarn layer number information of the unit structure, and m is the weft yarn column number of the primitive structure.

* * * * *